United States Patent Office 3,427,815
Patented Feb. 18, 1969

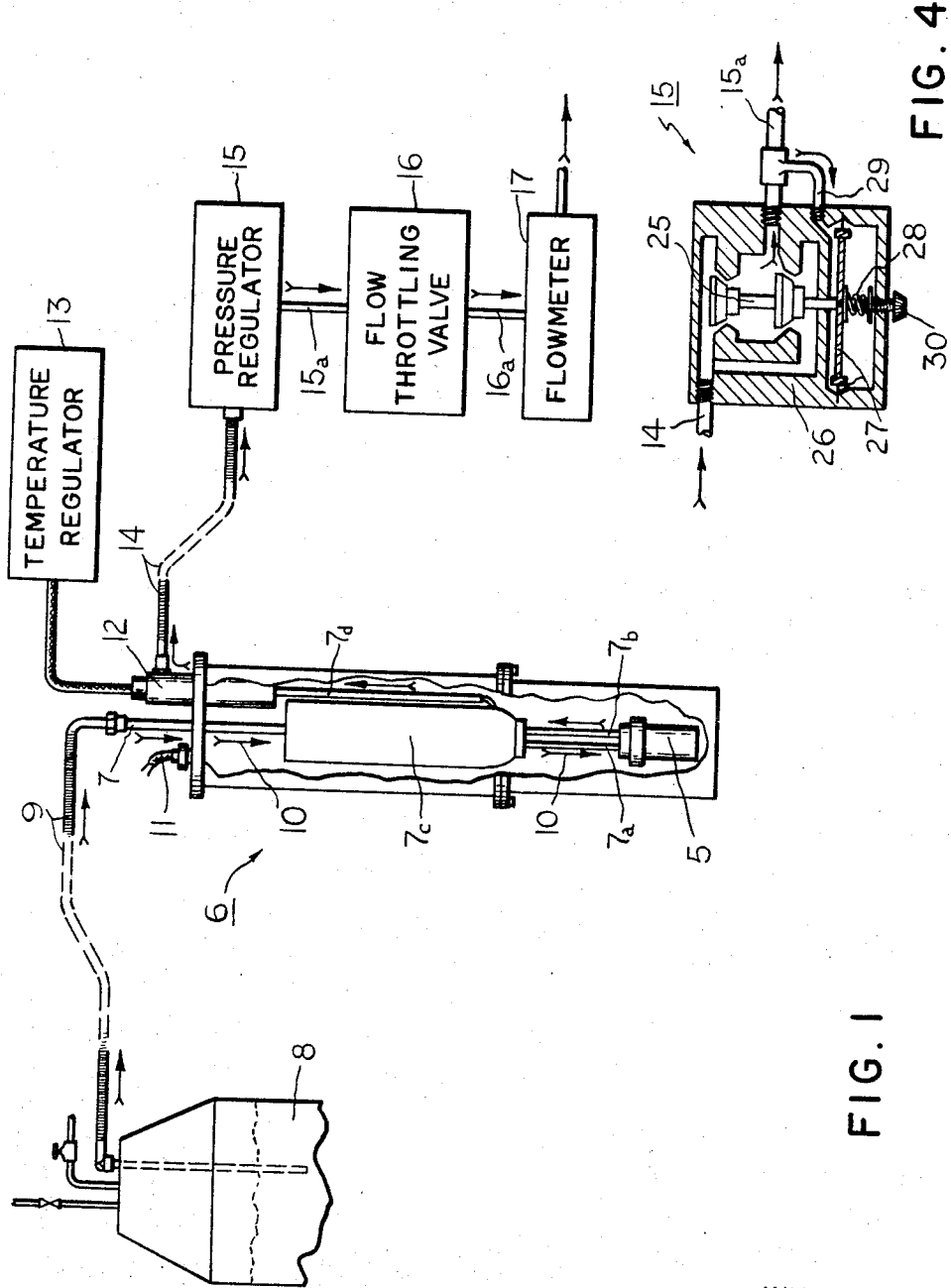

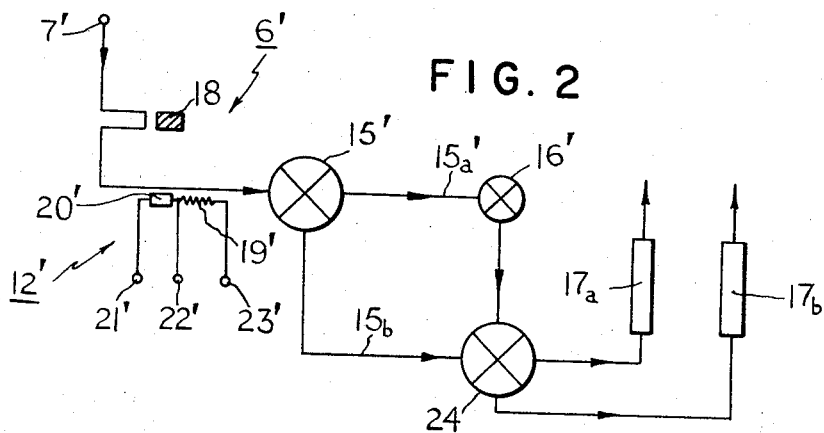
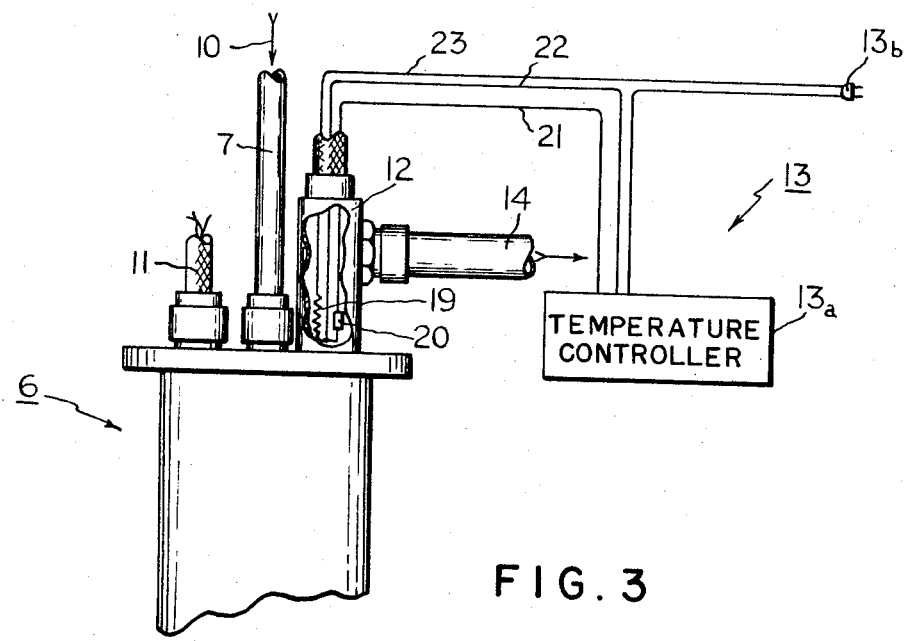

3,427,815
CRYOGENIC TEMPERAURE CONTROL
Joel R. Pitlor, Belmont, Mass., assignor to Ventron Instruments Corp., Burlington, Mass., a corporation of Massachusetts
Filed Jan. 24, 1967, Ser. No. 611,450
U.S. Cl. 62—52  10 Claims
Int. Cl. F17c 7/02; F25b 19/00

ABSTRACT OF THE DISCLOSURE

In preserving a sample at a predetermined low temperature via the open-loop flow of cryogenic fluid, the mass rate of cryogenic fluid flow is maintained essentially constant through downstream heater control of the fluid temperature at a conveniently high level, simultaneously with control of fluid pressure by a regulator at a further-downstream position, in advance of an orifice-type flow controller.

Background of the invention

The present invention relates to improvements in cryogenic temperature control, and, in one particular aspect, to novel and improved cryostat-type systems which are advantageously uncomplicated and yet highly precise, and wherein selectable predetermined temperatures within a wide low range may be produced economically and efficiently through preservation of substantially constant mass rate flow conditions by control elements disposed at sites which are at conveniently high temperatures.

Sample investigations and/or operation of various items at very low temperatures must in many cases be performed at critical predetermined or selectably different cryogenic temperatures which do not correspond to those associated with known liquid refrigerants. Moreover, the techniques which rely essentially upon the known temperatures of certain cryogenic fluids generally require the use of troublesome vacuum flasks which interfere with handling and observation of samples, are particularly wasteful of the valuable fluids over long periods, and depend upon supplies of different fluids at different pressures. So-called "cryostat" equipment, in which the temperature at a position of interest is measured and employed to establish error signals in a closed-loop or servo type control system, promise greater versatility but are difficult to stabilize and operate reliably and precisely, and tend to be complex and costly, largely because of the obvious difficulties involved in accurately and continuously controlling fluid flow at extremely low temperatures. As appears more fully hereinafter, difficulties and limitations of the aforesaid character may be relieved through only a rough upstream control of flow of a refrigerant in cooperation with the vernier controlling effects of inexpensive and reliable equipment operated at a downstream site and at substantially room temperature. Such downstream equipment continuously establishes essentially a constancy of the mass rate flow of the refrigerant in its passage in heat-transfer relationship with the sample, and thus forces the sample to be preserved at a selected fixed low temperature. Advantageously, one of the controlling elements comprises a heater, the output of which beneficially serves to raise the venting temperature to substantially the ambient value, and, the downstream control arrangement may conveniently be of an open-loop type.

Summary

In accordance with certain aspects of the present invention, it is recognized that a substantially constant mass rate flow of a cryogenic fluid from a source will be effective to maintain an exposed sample at a substantially constant predetermined temperature, and that such a constant mass rate flow, though ordinarily difficult to measure and control, may be established with very satisfactory accuracy when fluid at a substantially constant temperature and pressure is being throttled by a suitable valve or orifice. For these purposes, the desired constant temperature may readily be regulated by an electric heater, in a generally conventional type of thermostat circuit, disposed sufficiently downstream of the cryogenic-temperature site to act upon the refrigerant where it is in a relatively warm gaseous phase, and where the heater will have the additional advantageous effect of insuring that the gaseous fluid is in the vicinity of the ambient temperature before it is vented. Before the venting, however, the fluid which has been brought to the relatively high temperature is acted upon by a known form of self-controlled pressure regulator which delivers it downstream at a substantially constant pressure. Thereafter, the fluid at the substantially constant predetermined temperatures and pressures is forced to flow through a constricted opening, such as that provided by a needle valve, the downstream side of which is at a lower predetermined discharge pressure, preferably that of the ambient atmosphere. A substantially constant mass rate flow of the fluid must then pass to discharge, and, in turn, the upstream cryogenic-temperature flow of refrigerant in the same unvented flow path must be maintained at a constant mass flow rate, as desired. The action of the pressure regulator in this path is particularly beneficial also in that it importantly stabilizes or smooths out what might otherwise be error-inducing fluctuations in the flow, stemming from such factors as erratic localized vaporizations.

Accordingly, it is one of the objects of the present invention to improve the regulation of cryogenic fluid flow by maintaining a substantially constant mass flow rate via independent control of factors determining such rate.

Another object is to provide unique and advantageous regulation of selected low temperatures within a wide range through control at higher temperatures of the factors determining a substantially constant mass rate of flow of a cryogenic fluid.

A further object is to provide novel and improved cryogenic apparatus in which independent control units of inexpensive form operated reliably and efficiently at relatively high temperatures cooperatively established substantially constant mass rate of flow of a fluid at cryogenic temperatures in another portion of a pressurized fluid flow path.

Still further, it is an object of this invention to provide uncomplicated and efficient cryostat-type apparatus wherein a sample may be preserved at selected low temperatures in response to combined adjustable effects of a high-temperature controller, pressure regulator, and flow throttler, disposed in downstream relationship and in a conveniently higher-temperature operating environment.

Although the features and aspects of this invention which are considered to be novel are set forth in the appended claims, further details as to preferred practices and as to the further objects and advantages thereof may be most readily comprehended through reference to the following description taken in connection with the accompanying drawings.

Brief description of the drawings

FIGURE 1 illustrates an improved cryogenic system for maintaining a sample at a substantially constant temperature, certain portions being in block and pictorial form;

FIGURE 2 presents a schematic diagram for a system such as that of FIGURE 1, together with associated flow monitoring meters;

FIGURE 3 depicts an enlarged and partly cross-sectioned fragment of the cryostat-type assembly of FIGURE 1, including details of the associated electrical heater type thermostat unit; and FIGURE 4 is a partly cross-sectioned representation of one type of pressure regulator suitable for use in the system of FIGURES 1 and 2.

*Description of the preferred embodiments*

The cryogenic system appearing in FIGURE 1 is intended to preserve substantially constant the temperature selected for a specimen enclosed within the sample holder 5 mounted within an evacuated cryostat-type unit 6, a typical range for its span of temperature selections being from about 4.2° K. to 400° K. Inlet 7 for this unit is supplied with an inert cooling liquid, such as liquid nitrogen or helium, from a remote pressurized tank source 8 by way of a flexible insulated transfer line 9 which is preferably of a double-walled type having its outer concentric passageway evacuated. Liquid coolant within tank 8 is kept at a suitable pressure, by conventional means not requiring discussion here, tending to establish a rate of refrigerant flow to the sample area which will bring that sample roughly near the temperature of interest. In this connection, it should be understood that the liquid refrigerant flow via inlet 7 is thence into the enclosed sample chamber 5 through line $7_a$, where it conductively and/or convectively cools the sample, and is then exhausted through line $7_b$, a radiation shield or jacketing $7_c$, and outlet line $7_d$; arrows 10 trace this flow. Electrical circuit couplings by way of cabling 11 facilitate the measurement of internal temperatures and application of trim heat through known forms of devices serving these purposes. Without more, the sample temperature cannot be set precisely to any predetermined value, and, even if recourse is had to relatively costly and troublesome regulating equipment operating at the cryogenic temperatures, there can nevertheless be unresolved difficulties such as those stemming from non-uniform insulating characteristics and unwanted gradual or random burst type vaporizations of the cryogen. The improved system advantageously does not rely upon controls operating directly at or close to the cryogenic temperatures, however, and, instead employs essentially conventional forms of control devices, albeit in a unique arrangement and cooperating relationship, which are disposed in the more favorable relatively high-temperature environments of the same unopened flow path at further-downstream positions. One of these control devices comprises a heater, 12, into which the outlet line $7_d$ feeds the refrigerant after it has circulated through unit 6 and has assumed a substantially gaseous state; this heater is preferably electrical and is associated with a temperature regulator 13 supplying such power as is needed to maintain a relatively high substantially constant predetermined temperature, preferably about the ambient or room temperature (example: 50–80° F.), for the fluid which it passes onward through line 14 to the flow stabilizer in the form of a self-controlled pressure regulator 15. The fluid flow leaving outlet $15_a$ of the pressure regulator is established at a substantially constant predetermined pressure above a final venting or discharge pressure, and thus possesses both a substantially constant predetermined temperature and pressure as it reaches the further-downstream flow throttling valve 16. The latter, which may comprise a variable-orifice device such as a needle valve, is set to establish a limited or constricted opening which, on its downstream side in outlet $16_a$, witnesses a relatively low predetermined pressure, preferably about the ambient atmospheric pressure. Flowmeter 17 serves as a monitoring aid in setting the operation of the system, but does not otherwise constitute an essential feature of the automatic control arrangement.

Heating by device 12 is important in three respects; primarily, it establishes the needed substantially constant temperature for flow control purposes, but, in addition, it beneficially causes the downstream fluid temperature to be warm enough to promote efficient and reliable operation of the pressure regulator and throttling valve which follow it, and it insures that the spent fluid will not produce unwanted frosting or cold-induced damage when ultimately vented to the atmosphere. Regulator 15, in operating to preserve a substantially constant pressure on its downstream side, also yields a highly beneficial stabilizing effect on the upstream side by smoothing out gross and sudden fluctuations in pressures there, and, in turn, of the flow of cryogen. With a fluid temperature and pressure held substantially constant on the upstream side, and with known substantially fixed conditions on its downstream side, the simple flow-throttling device 16 necessarily establishes a substantially constant mass rate of fluid flow. That same mass rate of flow then perforce exists further upstream, at the site of the sample, where exceedingly low temperatures are witnessed, even though there are no separate control devices situated there. Rapidly-averaged constancy of mass rate of fluid flow insures that the low sample temperature is held substantially fixed and at a desired value.

The schematic system portrayal in FIGURE 2 includes a designation 18 of a sample or other item which is to be sustained accurately at a predetermined low temperature by the flow of cryogen from an inlet 7' in communication with a liquid cryogen source pressurized to establish roughly the amount of flow in a cryostat-type arrangement 6', needed to bring the sample into near vicinities of the desired temperature. An auxiliary heater (not shown) may be employed to trim the sample temperature. Heater provisions 12 raise the downstream temperature to about the ambient level, and conveniently include an electrical resistance heater 19' and a temperature sensor 20' in a generally conventional electrical thermostat network via the couplings 21'–23'. An electric heater is preferred because it can offer a very rapid response time, with the thermal energy being efficiently and quickly imparted to the fluid. Pressure regulator 15' normally delivers its output to flow throttling valve 16' via flow connection $15_{a'}$, but, in addition, the flow may be diverted to one of high and low range monitoring flowmeters $17_a$ and $17_b$ by way of flow connection $15_b$ and a selector valve 24. The auxiliary flowmeters $17_a$ and $17_b$ may conveniently be of a known floating-ball type, and provide a ready means for establishing that the controls are being set and operated as intended.

Heater assembly 12 is shown in FIGURE 3, with the electrical-resistance heater element 19 and temperature sensor 20 (both of known forms) being disposed to effect the wanted relatively high temperature of the fluid emitted from unit 6. A simple 300-watt AC heater element suffices to produce a 50–80° F. temperature in one system, for example, and the sensor 20 may comprise a thermistor, bimetal or comparable temperature detector. Temperature regulator arrangement 13 may include a known form of simple on-off switching circuitry $13_a$ for supply of power from source $13_b$ to the heater, or, alternatively, the controller $13_a$ may be of a more sophisticated proportional-control type.

As an example of one pressure regulator arrangement, 15, suitable for controlling pressures and stabilizing the flow, a spring-biased diaphragm and pressure-monitoring controller unit is portrayed in FIGURE 4. There, the inlet flow of warmed fluid in line 14 is passed to outlet $15_a$, and upstream and downstream pressures are controlled, in accordance with instantaneous orientations of the vertically-movable statically-balanced (i.e. double-headed) spindle 25. Cooperating valve seats in the body 26 are more nearly closed by the valve heads when the spindle-actuating diaphragm 27 is pressed downwardly against force of the adjustable biasing spring 28 by action of increasing pressure bled thereto from the downstream or outlet side via coupling 29. Conversely, decrease in the downstream pressure, from a predetermined level, results in lesser pressure atop diaphragm 27, such that the upward force of biasing spring 28 raises the valve spindle to increase the regulator output and, thereby, to preserve the downstream pressure at the wanted value. Spring biasing forces may be set to produce desired downstream pressures through manual adjustments of control knob 30.

Those skilled in the art will recognize that other forms of pressure controllers may be employed with like beneficial results. Similarly, the throttling valve and heater-thermostat units may be replaced by equivalent devices to occasion the precision vernier control of cryogenic temperatures. Depending upon the degree of automaticity which is sought, the operations of the control elements may be forced to be related, to one another and/or to such devices as the cryogen source pressure controller, sample heater and temperature sensor, ambient temperature and pressure detectors, and the like. Accordingly, it should be understood that the specific preferred embodiments and practices which have been depicted and described herein have been presented by way of disclosure rather than limitation, and that various modifications, combinations and substitutions may be effected without departure from the spirit and scope of this invention in its broader aspects and as set forth in the accompanying claims.

What I claim as new and desire to secure by Letters Patent of the United States is:

1. The method of maintaining a substantially constant low temperature at a predetermined site which comprises producing a flow of cryogenic fluid in a fluid-tight flow path and in a heat-exchange relationship with material at said site, holding the temperature of the fluid in said path downstream of said site at a substantially constant value which is high in relation to the temperature at said site, holding substantially constant the pressure of the fluid at the relatively high and substantially constant temperature, and passing the fluid at the substantially constant high temperature and pressure through a flow-restricting opening downstream in said path, whereby the mass rate of flow of said fluid is preserved substantially constant in said path upstream of said opening and, thereby, the temperature at said site is maintained substantially constant.

2. The method of maintaining a substantially constant low temperature at a predetermined site as set forth in claim 1 wherein the step of holding the temperature at a substantially constant value comprises adding sufficient heat to the fluid in said path downstream of said site to increase the temperature to said value.

3. The method of maintaining a substantially constant low temperature at a predetermined site as set forth in claim 2 wherein the step of holding the temperature at a substantially constant value includes sensing the temperature of the fluid in said path downstream of said site and adding heat which prevents the temperature there from falling below a predetermined temperature.

4. The method of maintaining a substantially constant low temperature at a predetermined site as set forth in claim 3 wherein the step of producing the flow of fluid includes flowing liquid cryogenic fluid upstream in said path and allowing the liquid fluid to assume a substantially vaporized state downstream of said site, and wherein the step of holding the temperature at a substantially constant value includes holding the vaporized fluid at about the same temperature as that of the ambient environment.

5. The method of maintaining a substantially constant low temperature at a predetermined site as set forth in claim 1 wherein the step of producing the flow of fluid includes flowing cryogenic fluid from a source and through a holder for a sample at said site at roughly approximately the rate which should produce the said low temperature in the sample, whereby the downstream temperature, pressure, and restricted flow effect a superimposed control upon the flow of fluid which establishes said substantially constant mass rate of flow.

6. The method of maintaining a substantially constant low temperature at a predetermined site as set forth in claim 1 wherein the step of holding the pressure substantially constant includes regulating the pressure downstream of a position where the temperature is held constant at the relatively high value, and wherein the step of passing the fluid through the flow-restricting opening includes passing the fluid through the opening downstream of the positions where the temperature and pressure are held substantially constant.

7. The method of maintaining a substantially constant low temperature at a predetermined site as set forth in claim 6 wherein the step of holding the pressure substantially constant includes sensing the fluid pressure at a downstream position and variably valving the fluid flow in said path upstream of the sensing position to maintain the pressure substantially constant.

8. The method of maintaining a substantially constant low temperature at a predetermined site as set forth in claim 7 wherein the step of passing the fluid through the flow-restricting opening includes exposing the downstream side of the opening to a substantially constant pressure less than that of the pressure held substantially constant on the upstream side thereof.

9. The method of maintaining a substantially constant low temperature as set forth in claim 8 wherein the step of exposing the downstream side of the opening to pressure includes exposing it to substantially the ambient atmospheric pressure.

10. The method of maintaining a substantially constant temperature at a predetermined site which comprises producing a flow of cryogenic fluid in a fluid-tight path and in a heat-exchange relationship with material at said site, holding the temperature of the fluid in said path downstream of said site at a substantially constant value which is high in relation to the temperature of the fluid at said site, and maintaining substantially constant the volumetric flow rate of the substantially-constant-temperature fluid downstream in said flow path, whereby the mass rate of flow of the fluid is preserved substantially constant upstream in said path and, thereby, the temperature at said site is maintained substantially constant.

References Cited

UNITED STATES PATENTS 3,053,054   9/1962   Vignier _____ 62—52

MEYER PERLIN, *Primary Examiner.*

U.S. Cl. X.R.

62—217, 514